United States Patent
Forbes et al.

(10) Patent No.: US 11,483,959 B2
(45) Date of Patent: Nov. 1, 2022

(54) DISK ASSEMBLY WITH MULTI-PLANE ANGLE ADJUSTMENT AND RELATED SYSTEMS AND METHODS

(71) Applicant: CNH Industrial America LLC, New Holland, PA (US)

(72) Inventors: Alan Forbes, Waterford, WI (US); Michael G. Kovach, Morton, IL (US); David Long, Washington, IL (US); Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 490 days.

(21) Appl. No.: 16/587,228

(22) Filed: Sep. 30, 2019

(65) Prior Publication Data
US 2021/0092894 A1  Apr. 1, 2021

(51) Int. Cl.
*A01B 71/02* (2006.01)
*A01B 23/04* (2006.01)
*A01B 23/06* (2006.01)

(52) U.S. Cl.
CPC .......... *A01B 71/02* (2013.01); *A01B 23/046* (2013.01); *A01B 23/06* (2013.01)

(58) Field of Classification Search
CPC ....... A01B 23/046; A01B 23/06; A01B 71/02; A01B 71/04; A01B 33/024; A01B 13/025; A01B 7/00; A01B 5/04
See application file for complete search history.

(56) References Cited

U.S. PATENT DOCUMENTS

| | | | | | |
|---|---|---|---|---|---|
| 1,536,367 | A | * | 5/1925 | Wulff | A01B 23/06 172/558 |
| 1,961,561 | A | * | 6/1934 | Lemon | A01B 23/06 172/603 |
| 2,659,291 | A | * | 11/1953 | Tanke | A01B 23/06 172/603 |

(Continued)

FOREIGN PATENT DOCUMENTS

GB          699825 A      11/1953

OTHER PUBLICATIONS

International Search Report and Written Opinion Corresponding to Application No. PCT/US2020/053185 dated Dec. 14, 2020 (13 pages).

*Primary Examiner* — Jessica H Lutz
(74) *Attorney, Agent, or Firm* — Rebecca Henkel; Rickard DeMille

(57) ABSTRACT

A disk assembly for agricultural implements comprises a disk hanger including a proximal end and a distal end opposite the proximal end. The disk assembly further includes a hanger spindle supported relative to the distal end of the disk hanger for rotation about a first axis of rotation, and a blade spindle supported relative to the hanger spindle, with the blade spindle being rotatable about a second axis of rotation oriented non-parallel relative to the first axis of rotation. Additionally, the disk assembly includes a blade coupled to the blade spindle for rotation therewith about the second axis of rotation. Moreover, the disk assembly is configured such that rotation of the hanger spindle relative to the disk hanger about the first axis of rotation results in an adjustment of both an angle-of-engagement and a camber angle of the blade.

18 Claims, 10 Drawing Sheets

(56) References Cited

U.S. PATENT DOCUMENTS

| | | | | |
|---|---|---|---|---|
| 3,244,237 A * | 4/1966 | Keplinger | ............... | A01B 15/16 |
| | | | | 172/603 |
| 3,604,378 A | 9/1971 | McDaniel, Jr. | | |
| 4,113,030 A | 9/1978 | Walker | | |
| 4,646,663 A * | 3/1987 | Nikkel | ..................... | A01C 7/06 |
| | | | | 111/73 |
| 4,781,129 A * | 11/1988 | Swanson | ................ | A01C 5/064 |
| | | | | 172/603 |
| 5,458,203 A * | 10/1995 | Evers | ................... | A01B 21/086 |
| | | | | 172/569 |
| 5,595,130 A * | 1/1997 | Baugher | ................ | A01C 5/068 |
| | | | | 111/164 |
| 5,783,307 A | 7/1998 | Fagerburg et al. | | |
| 5,878,821 A * | 3/1999 | Flenker | ................. | A01B 49/02 |
| | | | | 172/569 |
| 5,915,481 A * | 6/1999 | Flenker | ................. | A01B 63/32 |
| | | | | 172/569 |
| 6,223,832 B1 | 5/2001 | Hook et al. | | |
| 7,575,066 B2 * | 8/2009 | Bauer | .................... | A01C 21/00 |
| | | | | 172/166 |
| 8,074,729 B2 | 12/2011 | Kovach et al. | | |
| 8,186,287 B2 | 5/2012 | Schilling et al. | | |
| 8,275,525 B2 | 9/2012 | Kowalchuk et al. | | |
| 8,714,276 B2 * | 5/2014 | Hake | ...................... | A01B 39/08 |
| | | | | 172/176 |
| 9,327,378 B2 | 5/2016 | Zemenchik et al. | | |
| 9,826,677 B2 | 11/2017 | Gervais et al. | | |
| 9,936,632 B2 | 4/2018 | Bruns et al. | | |
| 10,051,771 B2 | 8/2018 | Gebbeken et al. | | |
| 10,159,174 B2 * | 12/2018 | Gent | ....................... | A01C 5/06 |
| 2008/0248732 A1 | 10/2008 | Warrenburg | | |
| 2015/0163988 A1 * | 6/2015 | Swanson | ............... | A01B 21/086 |
| | | | | 172/569 |
| 2016/0324064 A1 | 11/2016 | Gray et al. | | |
| 2018/0235138 A1 * | 8/2018 | Bulizuik | .................. | A01B 5/00 |
| 2020/0084950 A1 * | 3/2020 | Peterson | ................ | A01B 49/06 |
| 2020/0323121 A1 * | 10/2020 | Larsen | ................. | A01B 61/046 |
| 2020/0359541 A1 * | 11/2020 | Ptacek | .................... | A01C 7/201 |

* cited by examiner

DISK ASSEMBLY WITH MULTI-PLANE ANGLE ADJUSTMENT AND RELATED SYSTEMS AND METHODS

FIELD OF THE INVENTION

The present subject matter relates generally to tillage implements and, more particularly, to a disk assembly and related systems and methods for adjusting the angle or orientation of an associated disk across multiple planes.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

Disk harrows typically include a plurality of steel disks or blades. In many instances, each blade has a given concavity. The blades, although tending to roll or rotate as they are pulled forward, penetrate into and break up the soil and stalks and other crop residue. Ideally, the disks engage the ground such that the soil and crop residue ride along and across the concave surfaces of the disks so as to be turned or inverted. For a given blade concavity, there is typically an optimal blade orientation at which the blade will operate without causing the back side of the blade to interact with unworked soil, thereby minimizing backpressure on the blade. Currently, tillage implements are commercially available that allow for the angle-of-attack or angle-of-engagement of blades to be adjusted relative to the travel direction. However, the camber angle of the blades (e.g., as defined relative to a vertical plane or reference line) also plays a significant role in the amount of backpressure experienced by a given blade, particularly as the angle-of-engagement is varied. Unfortunately, no commercially available tillage implements allow for adjustments of the camber angle of blades.

Accordingly, a disk assembly and related systems and methods for adjusting the angle or orientation of an associated blade across multiple planes (e.g., both a horizontal plane and a vertical plane) would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a disk assembly for agricultural implements. The disk assembly comprises a disk hanger including a proximal end and a distal end opposite the proximal end, with the proximal end being configured to be coupled to a frame of an agricultural implement. The disk assembly further includes a hanger spindle supported relative to the distal end of the disk hanger for rotation about a first axis of rotation, and a blade spindle supported relative to the hanger spindle, with the blade spindle being rotatable about a second axis of rotation oriented non-parallel relative to the first axis of rotation. Additionally, the disk assembly includes a blade coupled to the blade spindle for rotation therewith about the second axis of rotation, with the blade defining an angle-of-engagement relative to a horizontal reference line and a camber angle relative to a vertical reference line. Moreover, the disk assembly is configured such that rotation of the hanger spindle relative to the disk hanger about the first axis of rotation results in an adjustment of both the angle-of-engagement and the camber angle of the blade.

In another aspect, the present subject matter is directed to a system for adjusting the orientation of blades of agricultural implements. The system includes a disk assembly configured to be supported relative to a frame of an agricultural implement. The disk assembly includes a disk hanger, a hanger spindle supported relative to the disk hanger for rotation about a first axis of rotation, and a blade spindle supported relative to the hanger spindle, with the blade spindle being rotatable about a second axis of rotation oriented non-parallel relative to the first axis of rotation. The disk assembly also includes a blade coupled to the blade spindle for rotation therewith about the second axis of rotation, with the blade defining an angle-of-engagement relative to a horizontal reference line and a camber angle relative to a vertical reference line. Moreover, the system includes a pivot linkage coupled to the hanger spindle such that actuation of the pivot linkage results in rotation of the hanger spindle about the first axis of rotation. Additionally, as the pivot linkage is actuated, the hanger spindle is rotated relative to the disk hanger about the first axis of rotation in a manner that results in an adjustment of both the angle-of-engagement and the camber angle of the blade In a further aspect, the present subject matter is directed to a method for adjusting the orientation of blades of agricultural implements. The method includes supporting a blade of a disk assembly relative to a frame of an agricultural implement such that the blade defines an angle-of-engagement relative to a horizontal reference line and a camber angle relative to a vertical reference line. The disk assembly includes a disk hanger including a proximal end configured to be coupled to the frame and a distal end opposite the proximal end. In addition, the disk assembly includes a hanger spindle supported relative to the distal end of the disk hanger for rotation about a first axis of rotation, and a blade spindle supported relative to the hanger spindle, with the blade spindle being rotatable about a second axis of rotation oriented non-parallel relative to the first axis of rotation and the blade being coupled to the blade spindle for rotation therewith about the second axis of rotation. Moreover, the method further includes rotating the hanger spindle about the first axis of rotation to simultaneously adjust both the angle-of-engagement and the camber angle of the blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
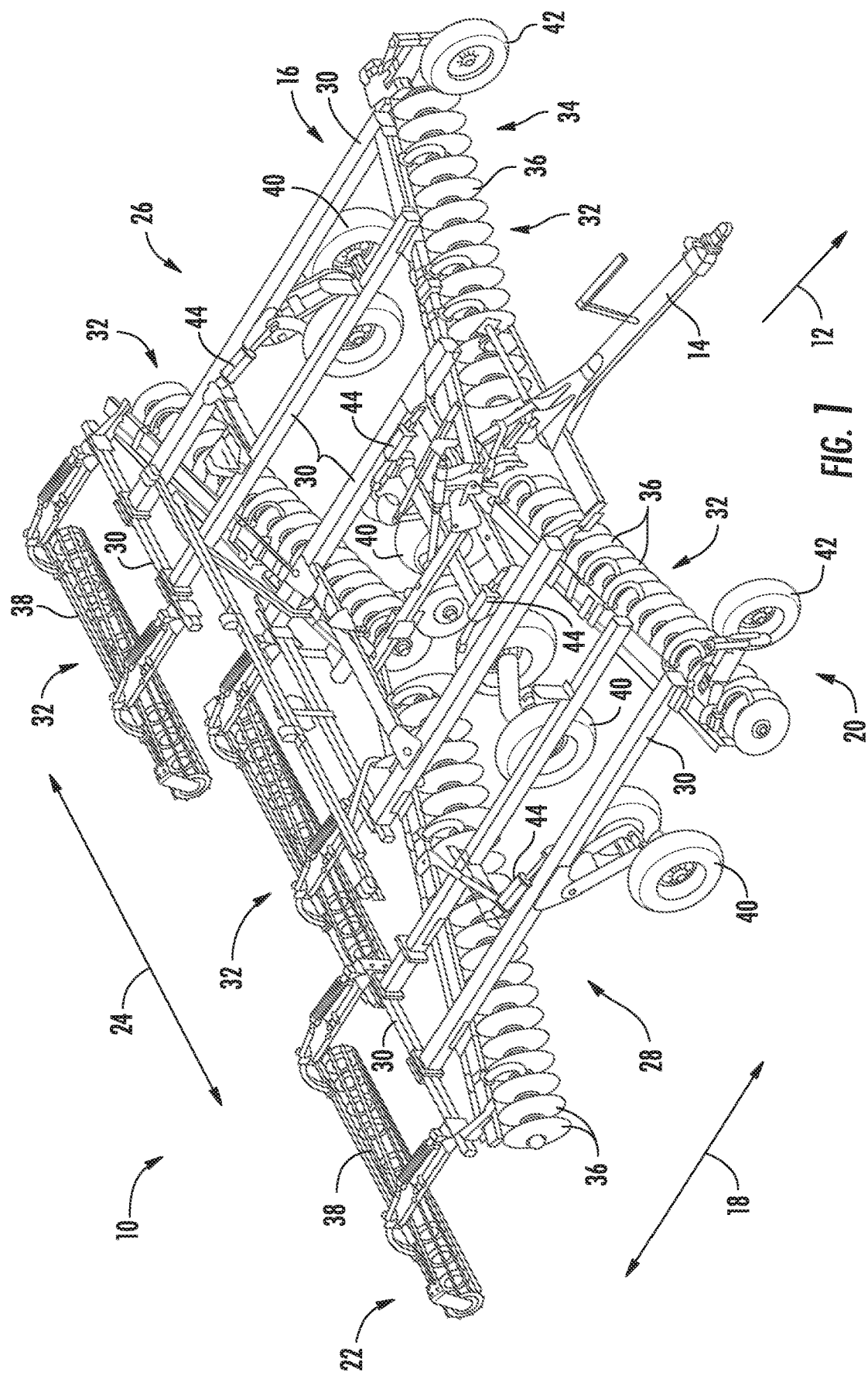
FIG. 1 illustrates a perspective view of one embodiment of a tillage implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a disk assembly and related systems and methods for adjusting the orientation of blades of an agricultural implement. Specifically, in several embodiments, the disk assembly may include a spindle assembly for rotatable supporting one or more blades relative to an associated disk hanger of the disk assembly. In one embodiment, the spindle assembly may include a hanger spindle rotatable relative to the disk hanger about a first axis of rotation and a blade spindle(s) coupled to the hanger spindle (e.g., via an associated blade hub(s)) such that the blade spindle(s) is rotatable about a second axis of rotation that is oriented non-parallel to the first axis of rotation. The blade(s) of the disk assembly may, in turn, be coupled to the blade spindle(s). With such an offset or non-parallel blade mounting configuration, rotation of the hanger spindle relative to the disk hanger about the first axis of rotation results in the orientation of the blade being adjusted across multiple planes. For instance, in one embodiment, rotation of the hanger spindle about its axis of rotation may allow for the angle-of-engagement of the blade(s) and the camber angle of the blade(s) to be adjusted simultaneously.

It should be appreciated that such simultaneous adjustability of the angle-of-engagement and the camber angle of the blade(s) may be particularly advantageous when used to minimize the amount of blade backpressure being applied to the unworked soil during the performance of an agricultural operation. For instance, it may be desirable to increase the camber angle of a blade(s) with reductions of the angle-of-engagement to ensure that the blade backpressure is minimized. In such instance, the disclosed spindle assembly may be configured to provide such simultaneous adjustability of the orientation of the blade(s).

Referring now to FIG. 1, a perspective view of one embodiment of a tillage implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or a plurality of implement components, such as various ground-engaging tools 32.

For example, in one embodiment, the frame 16 may be configured to support a plurality of disk blades or blades 36. In such an embodiment, each blade 36 may, for example, include both a concave side (not shown) and a convex side (not shown). Additionally, in several embodiments, each blade 36 may be oriented at both a desired angle-of-attack or angle-of-engagement (see FIGS. 3A and 3B) relative to the travel direction 12 to promote more effective tilling of the soil, as well as a desired camber angle (see FIGS. 2A and 2B) relative to a vertical reference plane extending from the soil surface to minimize blade backpressure on the unworked soil.

Moreover, in one embodiment, the implement 10 may optionally include additional ground-engaging tools 32, such as one or more baskets or rotary firming wheels 38. As is generally understood, the baskets 38 may be configured to reduce the number of clods in the soil and/or firm the soil over which the implement 10 travels. It should be appreciated that, in other embodiments, the frame 16 may support any other suitable ground-engaging tools 32 and/or any suitable combination of various types of ground-engaging tools 32. For example, in one embodiment, the frame 16 may support any combination of shanks, leveling blades, tines, blades, basket assemblies, and/or the like.

As shown in FIG. 1, the implement 10 may also include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 40 located centrally on the implement's frame 16 between its forward and aft ends 20, 22, with the center support wheel assemblies 40 being spaced apart from one another in the lateral direction 24 of the implement 10 between its first and second sides 26, 28. In addition, the implement 10 may also include a plurality of forward support wheel assemblies 42 coupled to the frame 16 proximate to the forward end 20 of the frame 16, with the forward support wheel assemblies 42 being spaced apart from one another in the lateral direction 24 of the implement 10 between its first and second sides 26, 28. As shown in FIG. 1, the forward support wheel assemblies 42 may be spaced apart from the center support wheel assemblies 40 in the longitudinal direction 18 of the implement 10.

Additionally, the implement 10 may also include any suitable number of actuators for adjusting the relative positioning between various components of the implement 10. For instance, as shown, the implement 10 may include a plurality of linear actuators 44 (e.g., hydraulic or pneumatic cylinders) coupled between the center support wheel assemblies 40 and the frame 16 for raising and lowering the frame 16 relative to the ground, thereby allowing the penetration depth and/or the down pressure of the blades 36 to be adjusted. In alternate embodiments, the actuators 44 may be configured to adjust the relative positioning between any other components of the implement 10, such as the relative positioning between the front support wheel assemblies 42 and the frame 16 or between the blades 36 and the frame 16.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2A:
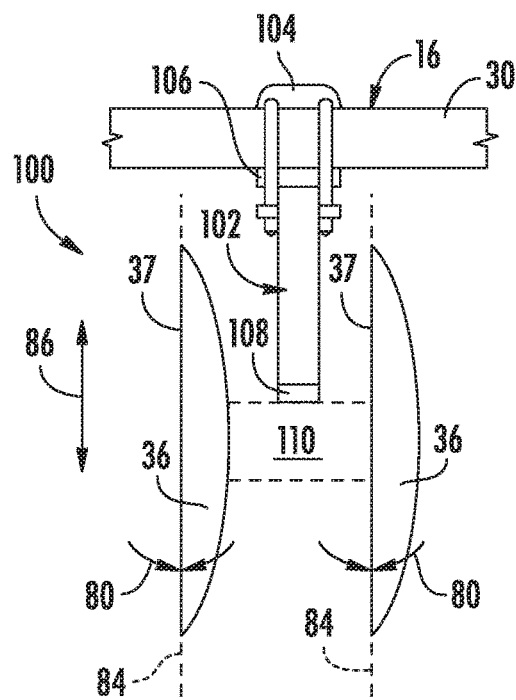
FIGS. 2A and 2B illustrate rear views of one embodiment of a disk assembly in accordance with aspects of the present subject matter, particularly illustrating the blades of the disk assembly oriented at different camber angles relative to an associated vertical reference line.
Figure 2B:
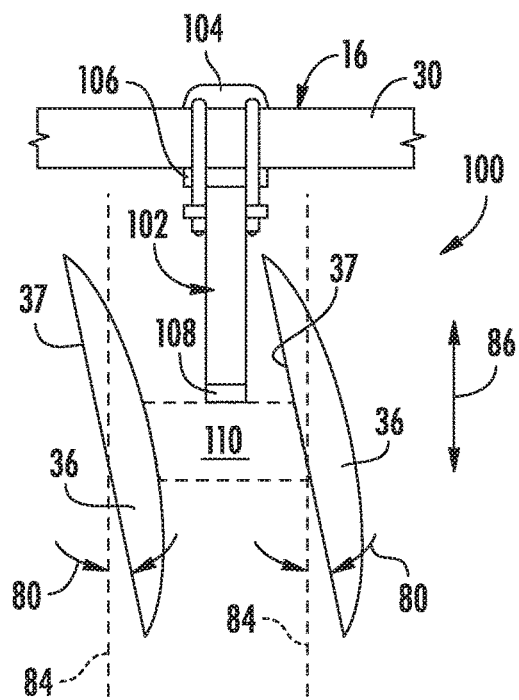
Figure 3A:
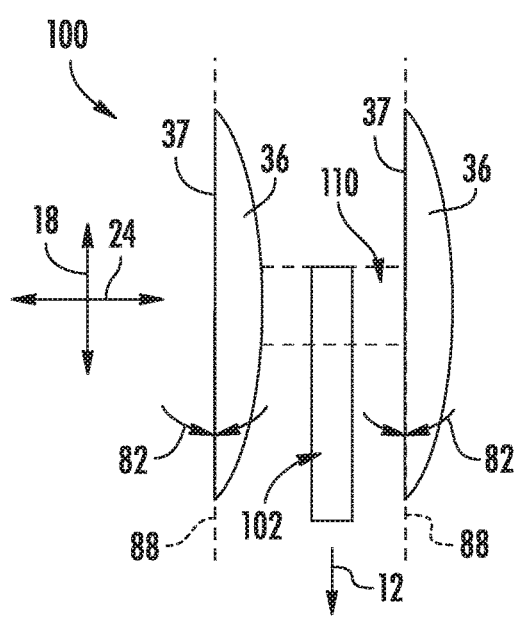
FIGS. 3A and 3B illustrate top views of the embodiment of the disk assembly shown in FIGS. 2A and 2B in accordance with aspects of the present subject matter, particularly illustrating the blades of the disk assembly oriented at different angles-of-engagement relative to an associated horizontal reference line.
Figure 3B:
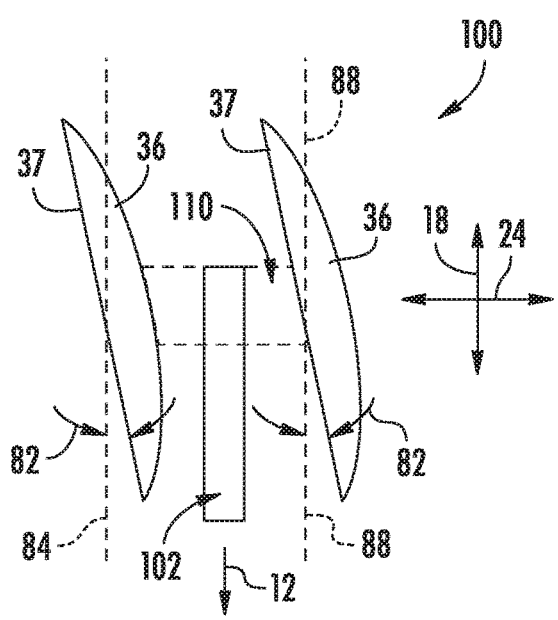

Referring now to FIGS. 2A and 2B and FIGS. 3A and 3B, simplified, schematic views of a disk assembly 100 having a tandem blade mounting configuration suitable for use with the agricultural implement 10 shown in FIG. 1 is illustrated in accordance with aspects of the present subject matter. Specifically, FIGS. 2A and 2B illustrate rear views of the disk assembly 100, with the blades 36 being oriented at differing camber angles 80 relative to a vertically oriented reference plane. Additionally, FIGS. 3A and 3B illustrate top views of the disk assembly 100 with the blades 36 being oriented at differing angles-of-engagement 82 relative to the travel direction 12 of the associated implement 10, with the frame member 30 and associated clamp bracket 104 shown in FIGS. 2A and 2B being removed from FIGS. 3A and 3B for purposes of illustration.

As particularly shown in FIGS. 2A and 2B, the blades 36 may be supported relative to a corresponding toolbar or frame member 30 of the implement frame 16 via a disk hanger 102 (and the associated clamp bracket 104). For instance, the disk hanger 102 may be configured as a "C-hanger" and may define a C-shaped profile between a proximal end 106 of the hanger 102 (e.g., the end coupled to the implement frame 16) and an opposed distal end 108 of the hanger 102. As will be described below, the blades 36 may, in several embodiments, be coupled to the disk hanger 102 via a spindle assembly 110 (shown schematically as a dashed box in FIGS. 2A-3B) that allows the orientation of the blades 36 to be varied across multiple planes to adjust both the camber angle 80 and the angle of engagement 82 of the blades 36.

In accordance with aspects of the present subject matter, the disks 36 may be oriented at various different camber angles 80 defined relative to a vertical reference line 84 extending along a vertical plane (e.g., oriented parallel to the vertical direction of the implement 10, as indicated by arrows 86 in FIGS. 2A and 2B). Specifically, FIG. 2A illustrates the blades 36 oriented at a zero camber angle 80 relative to the vertical reference line 84. At such an orientation, the planar, outer circumferential rim 37 of each blade 36 is generally oriented parallel to the vertical reference line 84. In contrast, FIG. 2B illustrates the blades 36 oriented at a non-zero camber angle 80 relative to the vertical reference line 84. At this orientation, the blades 36 have been pivoted such that outer circumferential rim 37 of each blade 36 is skewed or angled relative to the vertical reference line 84. In the illustrated embodiment, the camber angle 80 of each blade 36 is shown as being adjusted in one direction relative to the zero angle position (e.g., to achieve a positive camber angle). However, it should be appreciated that the disclosed spindle assembly 110 may also be configured to allow the camber angle 80 of each blade 36 to be adjusted in the opposite direction relative to the zero angle position (e.g., to achieve a negative camber angle) or across the zero angle position in both directions (e.g., to achieve both positive and negative camber angles).

Additionally, the blades 36 may also be configured to be oriented at various different angles-of-engagement 82 defined relative to a horizontal reference line 88 extending along a horizontal plane (e.g., oriented parallel to the horizontal plane defined by the longitudinal and lateral directions of the implement 10, as indicated by arrows 18, 24 in FIGS. 3A and 3B). In particular, the horizontal reference line 88 generally extends parallel to the direction of travel 12 of the implement 10. As shown in the top view of FIG. 3A, the blades 36 are oriented at a zero angle-of-engagement 82 relative to the horizontal reference line 88. At such orientation, the planar, outer circumferential rim 37 of each blade 36 is generally oriented parallel to the horizontal reference line 88. In contrast, the top view of FIG. 3B illustrates the blades 36 oriented at a non-zero angle-of-engagement 82 relative to the horizontal reference line 88. At this orientation, the blades 36 have been pivoted such that outer circumferential rim 36 of each blade 36 is skewed or angled relative to the horizontal reference line 88. In the illustrated embodiment, the angle-of-engagement 82 of each blade 36 is shown as being adjusted in one direction relative to the zero angle position (e.g., to achieve a positive angle-of-engagement). However, it should be appreciated that the disclosed spindle assembly 110 may also be configured to allow the angle-of-engagement 82 of each blade 36 to be adjusted in the opposite direction relative to the zero angle position (e.g., to achieve a negative angle-of-engagement) or across the zero angle position in both directions (e.g., to achieve both positive and negative angles-of-engagement).

As will be described below, the disclosed spindle assembly 110 may allow the orientation of the blades 36 to be varied across a range of different camber angles 80 and different angles-of-engagement 82. Specifically, in several embodiments, the spindle assembly 110 may be configured to allow such adjustments of the orientation of the blades 36 across the relevant vertical/horizontal planes to be made simultaneously. For instance, as indicated above, as the angle-of-engagement 82 of the blades 36 is adjusted, it is typically desirable to simultaneously adjust the camber angle 80 of the blades 36 to minimize blade backpressure. In this regard, the spindle assembly 110 may, in one embodiment, be configured such that, when the blades 36 are oriented at a zero angle-of-engagement 82 (e.g., at the orientation shown in FIG. 3A), the camber angle 80 of the blades 36 is at a maximum camber angle (e.g., at a similar orientation as that shown in FIG. 2B), and, when the blades 36 are oriented at a maximum angle-of-engagement 82 (e.g., at a similar orientation as that shown in FIG. 3B), the camber angle 80 of the blades 36 is equal to a zero camber angle (e.g., at the orientation shown in FIG. 2A). In this regard, the spindle assembly 110 may also be configured such that the camber angle 80 increases with reductions in the angle-of-engagement 82 and vice versa to ensure that the amount of blade backpressure on the unworked soil is minimized as the associated implement 10 is being used to perform an agricultural operation within the field.

Figure 4:
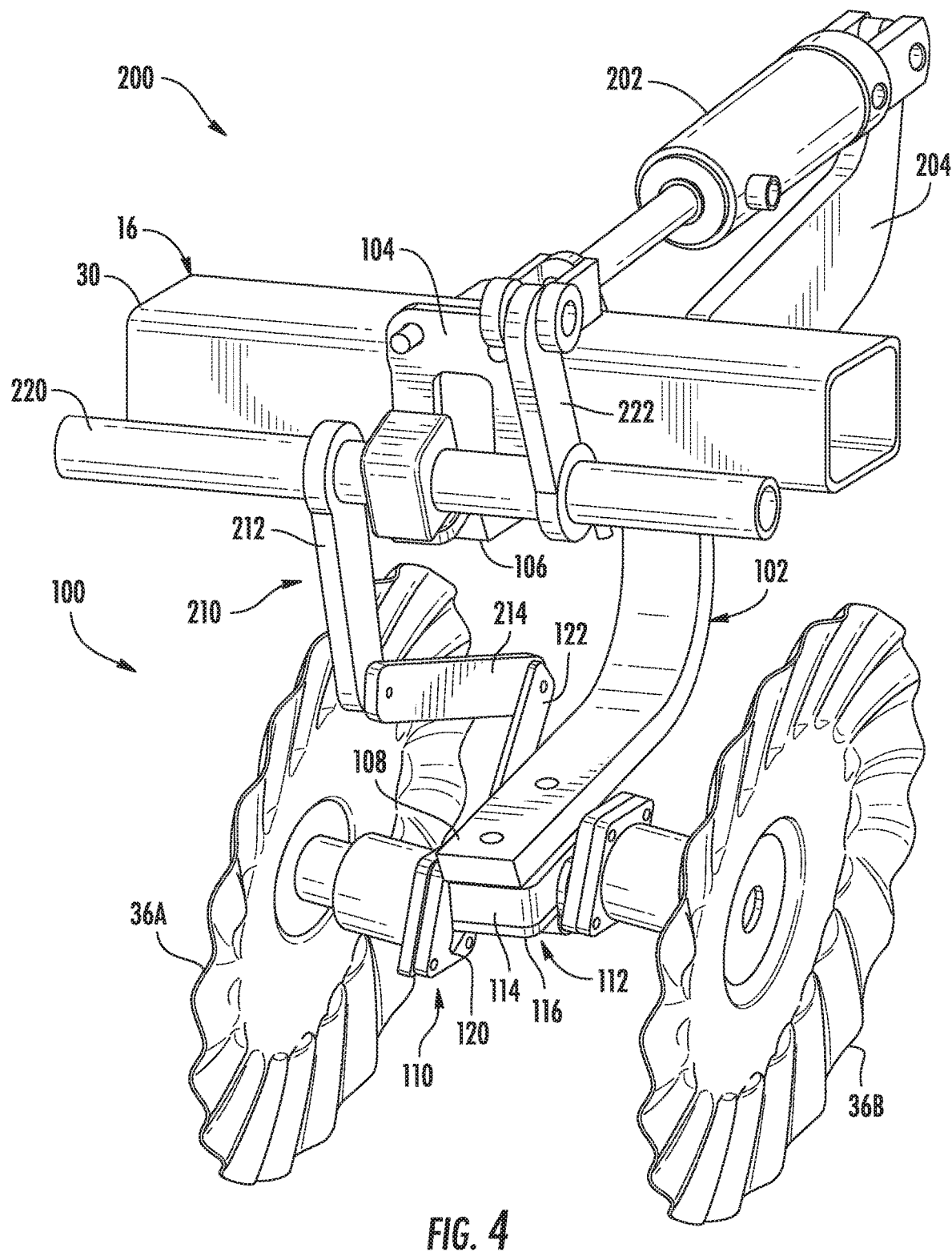
FIG. 4 illustrates a perspective view of a particular embodiment of a disk assembly and a related system for adjusting the orientation of blades of an agricultural implement in accordance with aspects of the present subject matter.
Figure 5:
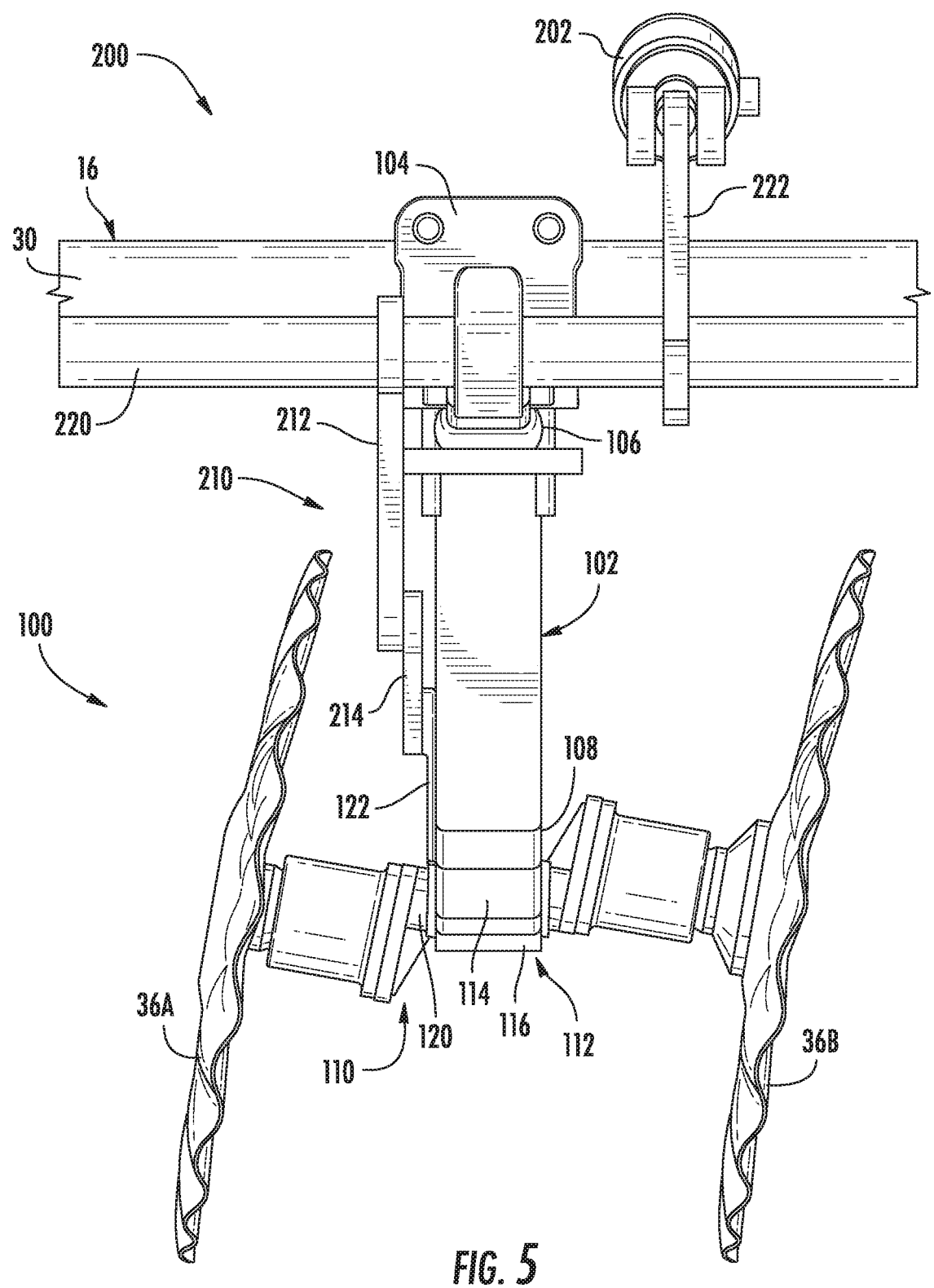
FIG. 5 illustrates a rear view of the disk assembly and related system shown in FIG. 4 in accordance with aspects of the present subject matter.

Referring now to FIGS. 4 and 5, perspective and rear views of a particular embodiment of a disk assembly 100 and related system 200 for adjusting the orientation of blades of an agricultural implement are illustrated in accordance with aspects of the present subject matter. In the illustrated embodiment, the disk assembly 100 is shown as having a tandem blade mounting configuration similar to that described above with reference to FIGS. 2A-3B. However, as will be described below with reference to FIG. 10, the disk assembly 100 may, instead, have a single blade mounting configuration.

As shown, the disk assembly 100 generally includes first and second blades 36A, 36B configured to be supported relative to a toolbar or frame member of an agricultural implement (e.g., frame member 30 of the implement frame 16 described above) via a disk hanger 102 and an associated spindle assembly 110. The blades 36A, 36B may generally have any suitable blade configuration known in the art. For instance, in the illustrated embodiment, each blade 36A, 36B is configured as a fluted-concave blade. In other embodiments, the blades 36A, 36B may have any other suitable configuration, such as the non-fluted or smooth-rim concave blade configuration shown in FIGS. 2A-3B and/or any other suitable blade configuration, including flat or non-concave blades.

The disk hanger 102 may generally have any suitable configuration that allows the hanger 102 to support the blades 36A, 36B relative to the implement frame 16. For instance, in the illustrated embodiment, the hanger 102 is configured as a "C-hanger" and defines a C-shaped profile extending between a proximal end 106 positioned adjacent to the implement frame 16 and a distal end 108 opposite the proximal end 106. As is generally understood, the proximal end 106 of the hanger 102 may be configured to be coupled to the adjacent frame member 30, such as by using a clamp bracket 104 and/or any other suitable mounting hardware. In contrast, the distal end 108 of the hanger 102 may be configured to be coupled to the spindle assembly 110 and the associated blades 36A, 36B. For instance, in the illustrated embodiment, a pillow block assembly 112 is coupled to the distal end 108 of the disk hanger 102 for supporting the spindle assembly 110 and the associated blades 36A, 36B. Specifically, the pillow block assembly 112 may include an upper clamp plate 114 coupled directly to the distal end 108 of the disk hanger 102 and a lower clamp plate 116 configured to be coupled to the upper clamp plate 114 such that a portion of the spindle assembly 110 is rotatably supported between the clamp plates 114, 116. For instance, as shown in the illustrated embodiment, a hanger spindle 120 of the spindle assembly 110 may extend through and be supported within the pillow block assembly 112 for rotation about a corresponding rotational axis.

As will be described in greater detail below, the spindle assembly 110 may be configured to rotationally support the blades 36A, 36B relative to the disk hanger 102 to allow the blades 36A, 36B to rotate relative to the soil during operation of the agricultural implement 10. In addition, the spindle assembly 110 may allow for the orientation of the blades 36A, 36B to be adjusted relative to multiple planes. For instance, in accordance with aspects of the present subject matter, the spindle assembly 110 may allow for simultaneous adjustment of both the angle-of-engagement 82 (FIGS. 3A and 3B) and the camber angle 80 (FIGS. 2A and 2B) of each blade 36A, 36B. Such adjustment is achieved by configuring the blades 36A, 36B to be rotatable about rotational axes that are offset from or non-parallel relative to the rotational axis about which the central hanger spindle 120 of the spindle assembly 110 is configured to be rotated. As a result, by rotating the central hanger spindle 120 about its rotational axis relative to the pillow block assembly 112 and the adjacent distal end 108 of the disk hanger 102, the angle-of-engagement 82 and the camber angle 80 of each blade 36A. 36B may be adjusted simultaneously as the orientation of the blades 36A, 36B is varied across multiple planes due to the offset mounting configuration.

Referring still to FIGS. 4 and 5, as indicated above, the present subject matter is also directed to a system 200 for adjusting the orientation of blades of an agricultural implement across multiple planes. As shown in the illustrated embodiment, in addition to the components of the disk assembly 100, the disclosed system 200 may also include components for actuating or rotating the spindle assembly 110 (particularly the central hanger spindle 120), thereby allowing for adjustment of the blade orientation. For instance, in the illustrated embodiment, the system 200 includes a linear actuator 202 (e.g., a hydraulic or pneumatic cylinder) coupled to or supported relative to the implement frame 16 (e.g., via a mounting bracket 204 (FIG. 4)). The linear actuator 202 is configured to be coupled to an associated pivot linkage 210 of the disclosed system 200, which is, in turn, coupled to the central hanger spindle 120. Specifically, as shown in FIG. 4, the pivot linkage 210 includes a pivot crank arm 212 and an intermediate linkage arm 214, with the intermediate linkage arm 214 being coupled to an adjacent spindle crank arm 122 secured to or formed integrally within the hanger spindle 120. As such, by extending or retracting the linear actuator 202, such motion of the actuator 202 may be transmitted through the pivot linkage 210 to the hanger spindle 120, thereby resulting in rotation of the spindle 120 about its axis of rotation. For instance, extension of the liner actuator 202 may result in rotation of the hanger spindle 120 in a first rotational direction while retraction of the linear actuator 202 may result in rotation of the hanger spindle 120 in an opposite, second rotational direction.

As shown in FIGS. 4 and 5, in several embodiments, the linear actuator 202 may be coupled to the pivot linkage 210 via a rockshaf 220. For instance, as particularly shown in FIG. 4, the linear actuator 202 is coupled to the rockshaf 220 via an actuator crank arm 222, with the rockshaft 220 being, in turn, coupled to the pivot crank arm 212 of the pivot linkage 210. In such embodiments, actuation of the linear actuator 202 results in rotation of the rockshaft 220 (via the connection provided by the actuator crank arm 222) and, thus, corresponding movement of the pivot linkage 210 (via the connection provided by the pivot crank arm 212) to rotationally actuate the hanger spindle 120 of the spindle assembly 110.

Figure 6:
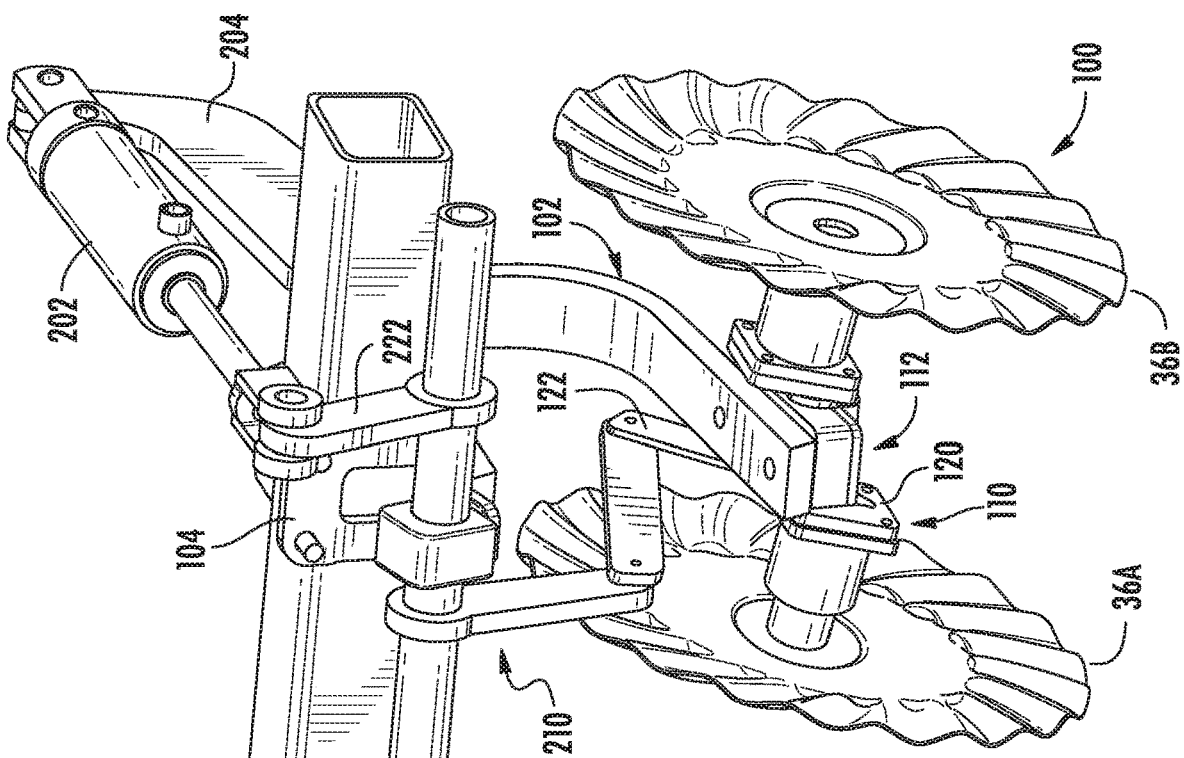
FIG. 6 illustrates a perspective view of two of the disk assemblies shown in FIGS. 4 and 5 ganged together via an associated rockshaft of the disclosed system in accordance with aspects of the present subject matter.

It should be appreciated that, by using the rockshaft configuration shown in FIGS. 4 and 5, multiple disk assemblies 100 may be ganged together to allow a common actuator (e.g., the linear actuator 202) to be used to simultaneously adjust the orientation of the blades 36A, 36B of the ganged disk assemblies 100. For instance, FIG. 6 illustrates a perspective view of an embodiment of the disclosed system 200 including two disk assemblies 100 ganged together via the rockshaft 220. In such an embodiment, a respective pivot linkage 210 may be coupled between the rockshaft 220 and the hanger spindle 120 of each disk assembly 100. Accordingly, as the linear actuator 202 is extended or retracted, the corresponding rotation of the rockshaft 220 results in each pivot linkage 210 being actuated in a manner that rotationally actuates each respective hanger spindle 120, thereby allowing the orientation of the blades 36A, 36B of each disk assembly 100 to be adjusted simultaneously using a common actuator. In the embodiment shown in FIG. 6, only two disk assemblies 100 are shown as being ganged together via the rockshaft 220 for purposes of illustration and description. However, it should be appreciated that any number of disk assemblies 100 may be ganged together via the disclosed rockshaft configuration, such as three or more disk assemblies 100.

It should also be appreciated that, in other embodiments, the disclosed system 200 may utilize a non-ganged configuration in which a linear actuator 202 is provided in operative association with each disk assembly 100. For instance, as will be described below with reference to the embodiments shown in FIGS. 9 and 10, each pivot linkage 210 may, instead, be coupled to a respective linear actuator 202 without a rockshaft 220 being secured therebetween. In such an embodiment, the connection provided between the linear actuator 202 and the hanger spindle 120 of the associated disk assembly 100 via the pivot linkage 210 may allow the orientation of the corresponding blades 36A, 36B to be adjusted independent of other adjacent disk assemblies 100 of the implement 10.

Figure 7:
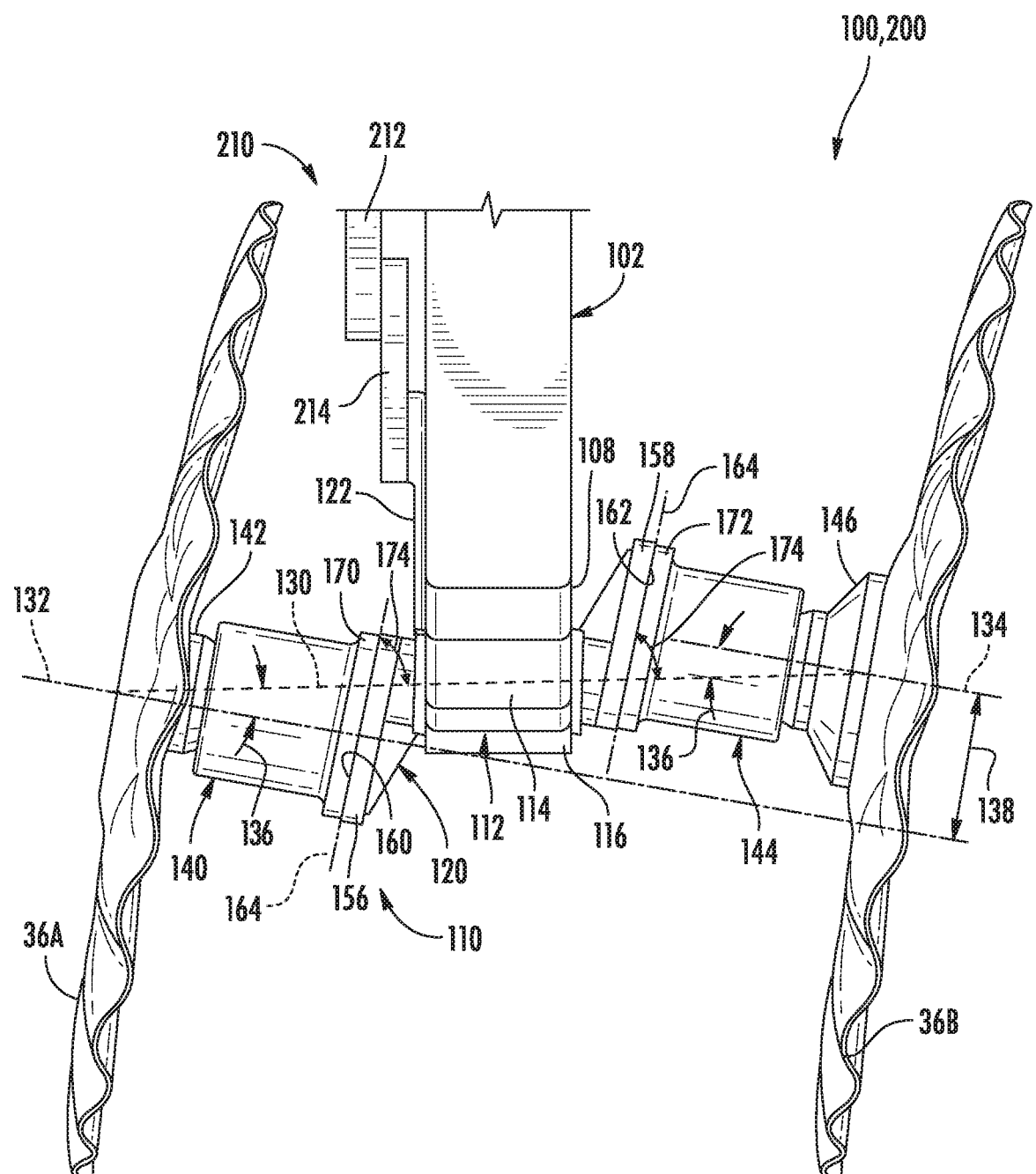
FIG. 7 illustrates a lower portion of the rear view of the disk assembly shown in FIG. 5, particularly illustrating a spindle assembly of the disk assembly coupled between the opposed blades of the disk assembly in accordance with aspects of the present subject matter.
Figure 8:
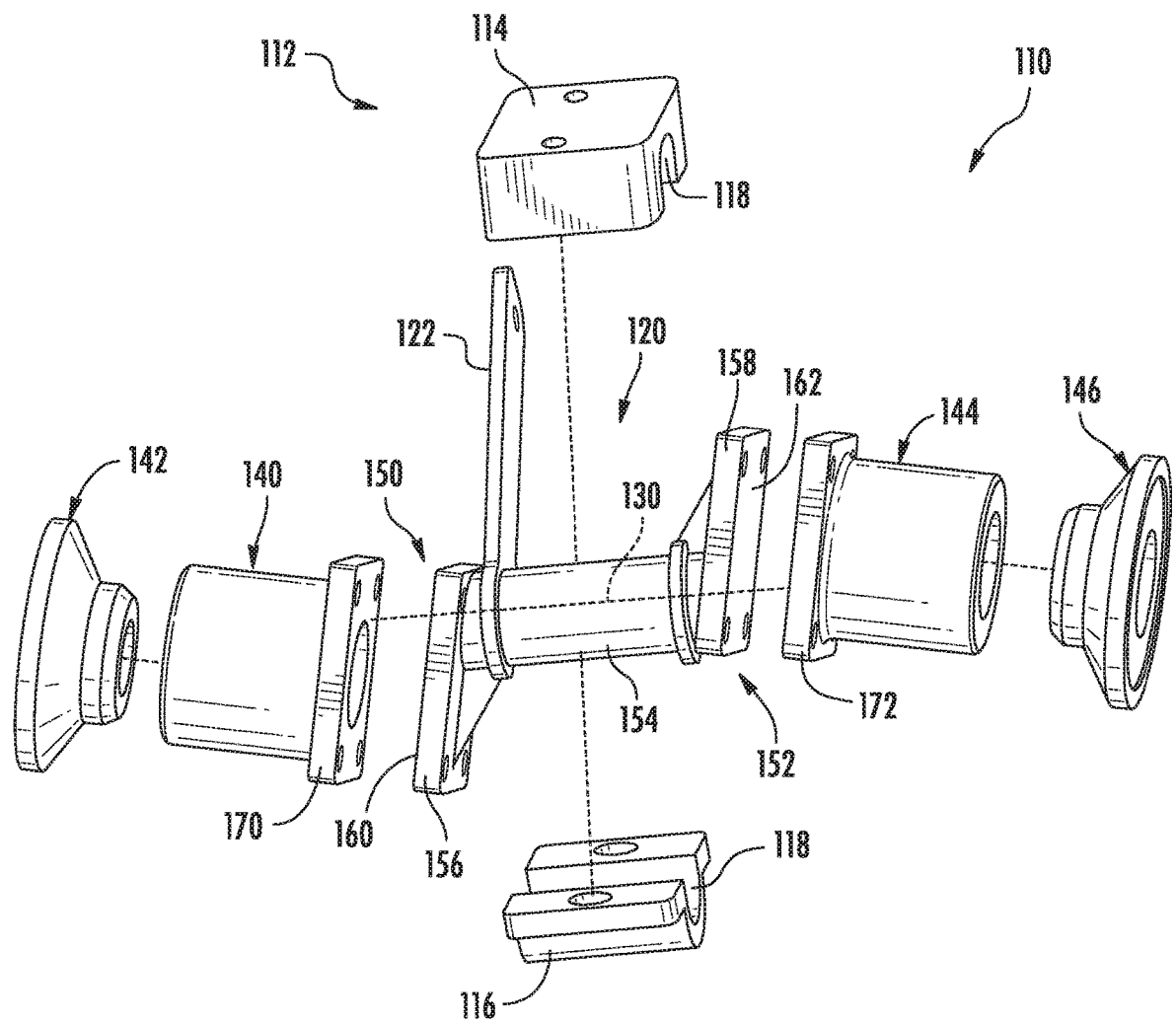
FIG. 8 illustrates an exploded view of the spindle assembly shown in FIG. 7 in accordance with aspects of the present subject matter.

Referring now to FIGS. 7 and 8, differing views of the spindle assembly 110 described above are illustrated in accordance with aspects of the present subject matter. Specifically, FIG. 7 illustrates a lower portion of the rear view of the disk assembly 100 shown in in FIG. 5, particularly illustrating the spindle assembly 110 supported relative to the distal end 108 of the hanger 102 and extending between the first and second disks 36A. 36B of the disk assembly 100. Additionally. FIG. 8 illustrates an exploded view of the spindle assembly 110 shown in FIG. 7.

As indicated above, the spindle assembly 110 includes a hanger spindle 120 configured to be supported relative to the distal end 108 of the hanger 102 via the pillow block assembly 112 for rotation about a central axis of rotation (indicated by dashed line 130 in FIG. 7). Additionally, in several embodiments, the spindle assembly 110 may also include a first blade hub/spindle pair (including a first blade hub 140 and associated first blade spindle 142) and a second blade hub/spindle pair (including a second blade hub 144 and associated second blade spindle 146) for coupling the first and second blades 36A, 36B, respectively, to the hanger spindle 120. As will be described below, the blade hub/spindle pairs may be configured to be coupled to the hanger spindle 120 such that each blades 36A, 36B is rotatable about an axis of rotation that is skewed or non-parallel relative to the axis of rotation 130 of the hanger spindle 120. For instance, the first blades 36A may be rotatable about a first blade axis of rotation (indicated by line 132 in FIG. 7), while the second blades 36B may be rotatable about a separate second blade axis of rotation (indicated by line 134 in FIG. 7), with both of such axes of rotation 132, 134 being oriented non-parallel relative to the axis of rotation 130 of the hanger spindle 120.

As particularly shown in FIG. 8, the hanger spindle 120 extends axially along its axis of rotation 130 between a first axial end 150 and a second axial end 152 and includes a central spindle portion 154 positioned between its opposed axial ends 150, 152. The central spindle portion 154 generally has a shaft-like configuration. For instance, as shown in FIG. 8, the central spindle portion 154 defines a cylindrical shape having a constant diameter along its axial length. Such a configuration allows the central spindle portion 154 to be supported between the upper and lower clamp plates 114, 116 of the pillow block assembly 112 for rotation about the central axis of rotation 130. Specifically, as shown in FIG. 8, each clamp plate 114, 116 defines a clamp channel 118 having a semi-circular cross-sectional shape generally corresponding to the cross-sectional shape of the central spindle portion 154 so that the clamp plates 114, 116 can be secured around the outer circumference of the central spindle portion 154 for supporting the hanger spindle 120 relative to the disk hanger 102. It should be appreciated that, although not shown, a bushing or other suitable bearing may be provided between the clamp plates 114, 116 and the central spindle portion 154 to ensure that the hanger spindle 120 is allowed to rotate relative to the pillow block assembly 112 and the disk hanger 102 about its axis of rotation 130.

Moreover, as shown in the illustrated embodiment, the hanger spindle 120 includes first and second mounting flanges 156, 158 positioned at its first and second axial ends 150, 152, respectively. Each mounting flange 156, 158 may generally define a planar mounting face or surface for rigidly coupling the adjacent blade hub 140, 144 to the hanger spindle 120 (e.g., using suitable fasteners). Specifically, as shown in FIG. 8, the first mounting flange 156 defines a first planar mounting surface 160 for coupling a corresponding planar mounting flange 170 of the first blade hub 140 to the hanger spindle 120. Similarly, the second mounting flange 158 defines a second planar mounting surface 162 for coupling a corresponding planar mounting flange 172 of the second blade hub 144 to the hanger spindle 120. As particularly shown in FIG. 7, the planar mounting surfaces 160, 162 of the hanger spindle 120 are oriented non-perpendicularly relative to the axis of rotation 130 of the hanger spindle 120. As a result, a planar mounting interface 164 is defined between each mounting flange 156, 158 of the hanger spindle 120 and the adjacent mounting flange 170, 172 of each blade hub 140, 144 that is skewed at an acute or obtuse offset mounting angle 174 (i.e., less than or greater than 90 degrees) relative to the central axis of rotation 130, depending on which side of the interface the offset angle 174 is being defined. In one embodiment, the offset angle 174 may be selected such that each mounting interface 164 is offset from perpendicular (relative to the axis of rotation 130) by a given amount generally corresponding to the desired maximum angle-of-engagement 82 and/or camber angle 80 for the blades 36A, 36B, such as by offsetting each mounting interface 164 from perpendicular by 18 degrees or 15 degrees or 12 degrees or any other suitable angular value. For instance, when each mounting interface 164 is offset from perpendicular by 15 degrees, the offset angle 174 will generally be equal to 75 degrees or 105 degrees relative to the axis of rotation 130, depending on which side of the interface the offset angle 174 is being defined (e.g., 75 degrees for the offset angles 174 shown in FIG. 7).

Referring still to FIGS. 7 and 8, as indicated above, each blade 36A, 36B may be rotatably coupled to the adjacent blade hub 140, 144 via a respective blade spindle 142, 146 for rotation about a respective axis of rotation 132, 134. Specifically, as shown in the illustrated embodiment, the first blade 36A is coupled to the first blade hub 140 via a first blade spindle 142 such that the first blade 36A and the associated blade spindle 142 are supported for rotation relative to the first blade hub 140 about a first blade axis of rotation 132. Similarly, the second blade 36B is coupled to the second blade hub 144 via a second blade spindle 146 such that the second blade 36B and the associated blade spindle 146 are supported for rotation relative to the second blade hub 144 about a second blade axis of rotation 134. It should be appreciated that, although not shown, a bearing or other suitable bearing-type member may be coupled between each blade hub/spindle to ensure that each blade spindle 142, 146 is allowed to rotate relative to the adjacent blade hub 140, 144 about its respective axis of rotation 132, 134.

By securing the blade hubs 140, 144 to the hanger spindle 120 using the offset, non-perpendicular mounting configuration described above, the axes of rotation 132, 134 for the blades 36A, 36B may be oriented non-parallel to the axis of rotation 130 of the hanger spindle 120. Specifically, as shown in FIG. 7, both the first blade axis of rotation 132 and the second blade axis of rotation 132 are oriented at a non-zero skew angle relative to the central axis of rotation 130, such as the acute angle 136 shown in the illustrated embodiment. In one embodiment, the blade axes of rotation 132, 134 may be oriented perpendicularly to the planar mounting interfaces 164 defines between the hanger spindle 120 and each blade hub 140, 144. In such an embodiment, the acute skew angle 136 shown in the illustrated embodiment may be equal to the amount of angular offset at which each planar mounting interface 164 is skewed from perpendicular relative to the central axis of rotation 130. Additionally, as shown in FIG. 7, while being offset from each other by a given distance 138, the blade axes of rotation 132, 134 are generally oriented parallel to each other. One of ordinary skill in the art will readily understand that such offset distance 138 is generally due to the mounting flanges 156, 158 of the hanger spindle 120 extending in opposed directions from each other relative to the central axis of rotation 130.

It should be appreciated that, by configuring the spindle assembly 110 in the manner described above, rotation of the hanger spindle 120 about its axis of rotation 130 will result in the orientation of each blade 36A, 36B being adjusted across multiple planes, thereby allowing both the angle-of-engagement 82 and camber angle 80 of each blade 36A, 36B to be simultaneously adjusted. For instance, as indicated above, the spindle crank arm 122 of the hanger spindle 120 may be coupled to a corresponding pivot linkage 210, which is, in turn, coupled a linear actuator 202. Thus, extension or retraction of the actuator 202 results in rotation of the hanger spindle 120 about the central axis of rotation 130. Given the rigid connection of the hanger spindle 120 to each blade hub 140, 144, such rotation of the hanger spindle 120 results in corresponding rotation of the blades 36A, 36B. In this regard, due to the offset mounting configuration of the blades 36A, 36B relative to the hanger spindle 120 (particularly the offset configuration between the blade axes of rotation 132, 134 and the central axis of rotation 130 of the hanger spindle 120), the orientation of each blade 36A, 36B is adjusted across multiple planes as the blades 36A, 36B rotate with the hanger spindle 120. Specifically, in several embodiments, the offset mounting configuration disclosed herein may provide for the camber angle 80 of each blade 36A, 36B to be increased as the angle-of-engagement 82 of each blade 36A, 36B is decreased (and vice versa) with rotation of the blades 36A, 36B with the hanger spindle 120. Thus, when the angle-of-engagement 82 of the blades 36A, 36B is set to zero, the camber angle 80 of the blades 36A, 36B may be at a maximum camber angle to minimize blade backpressure at such angle-of-attack. As the angle-of-engagement 82 of the blades 36A, 36B is increased from zero with rotation of the hanger spindle 120 in either direction, the camber angle 80 of the blades 36A, 36B may correspondingly decrease from the maximum camber angle to ensure that the blade backpressure is minimized as the angle-of-attack is varied. With such an arrangement, the camber angle 80 may, for instance, be equal to zero when the angle-of-engagement 82 of each blade 36A, 36B is equal to the maximum allowable angle-of-engagement.

It should also be appreciated that, given the configuration of the disclosed spindle assembly 110, the hanger spindle 120 may be prevented from rotating about its axis of rotation 130 during operation of the implement 10 due to the connection provided between the hanger spindle 120 and the linear actuator 202. As such, during the performance of an agricultural operation, each blade 36A, 36B may simply be configured to rotate about its respective blade axis of rotation 132, 134.

Figure 9:
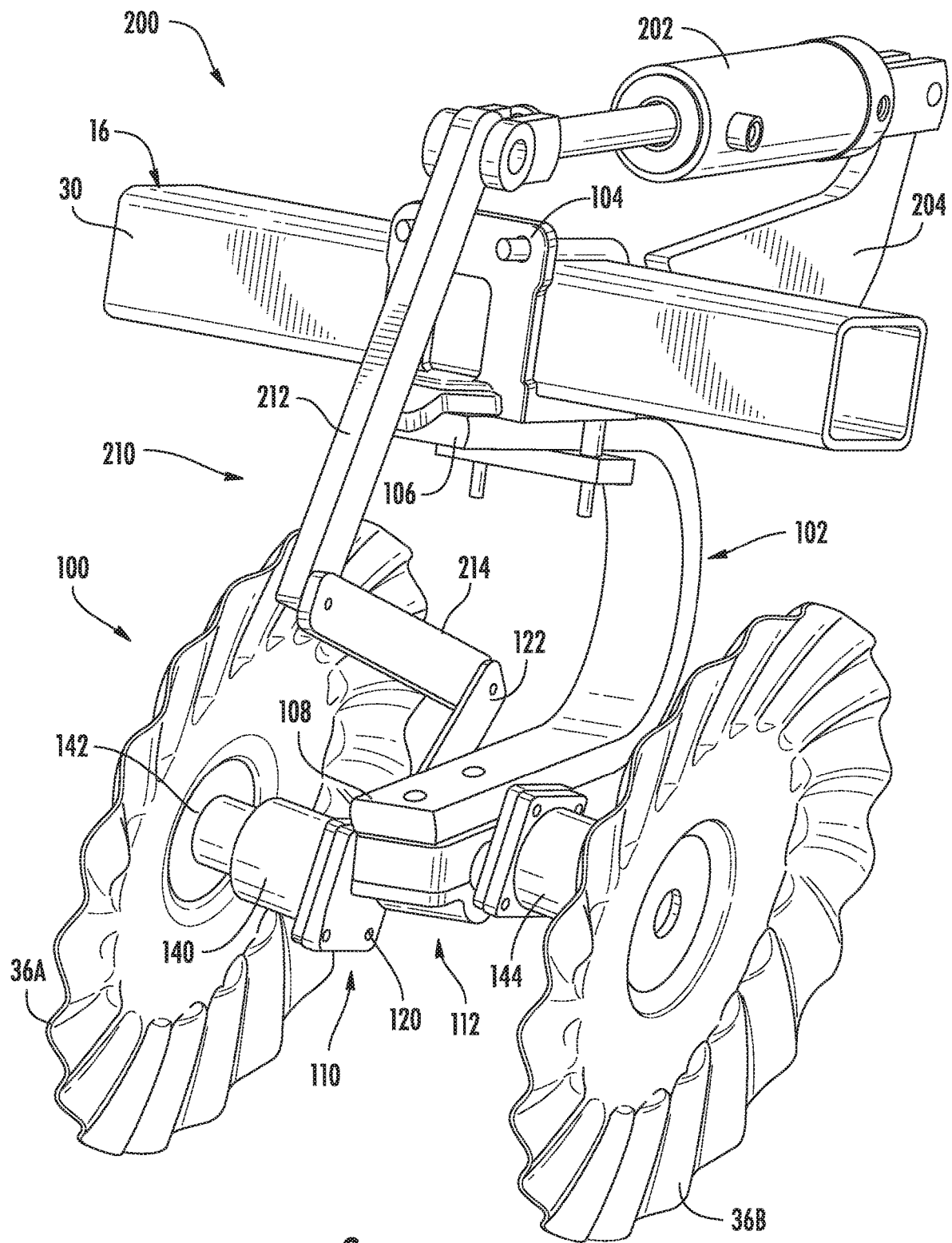
FIG. 9 illustrates a perspective view of an alternative embodiment of the system shown in FIG. 4, particularly illustrating a non-ganged arrangement for adjusting the orientation of blades of an agricultural implement in accordance with aspects of the present subject matter.

Referring now to FIG. 9, a perspective view of an alternative arrangement for the system 200 described above is illustrated in accordance with aspect of the present subject matter. As shown, the disk assembly 100, pivot linkage 210, and linear actuator 202 are generally configured the same as or similar to that described above with reference to FIGS. 4, 5, 7, and 8. However, in contrast to the system configuration described above in which the pivot linkage 210 is coupled to the rockshaft 220, the pivot crank arm 212 of the pivot linkage 210 is coupled directly to the linear actuator 202. As such, as opposed to the ganged arrangement described above, the linear actuator 202 is simply configured to adjust the orientation of the blades 36A, 36B of the associated disk assembly 100 via the connection provided between the linear actuator 202 and the hanger spindle 120 of the disk assembly 100 via the pivot linkage 210.

Figure 10:
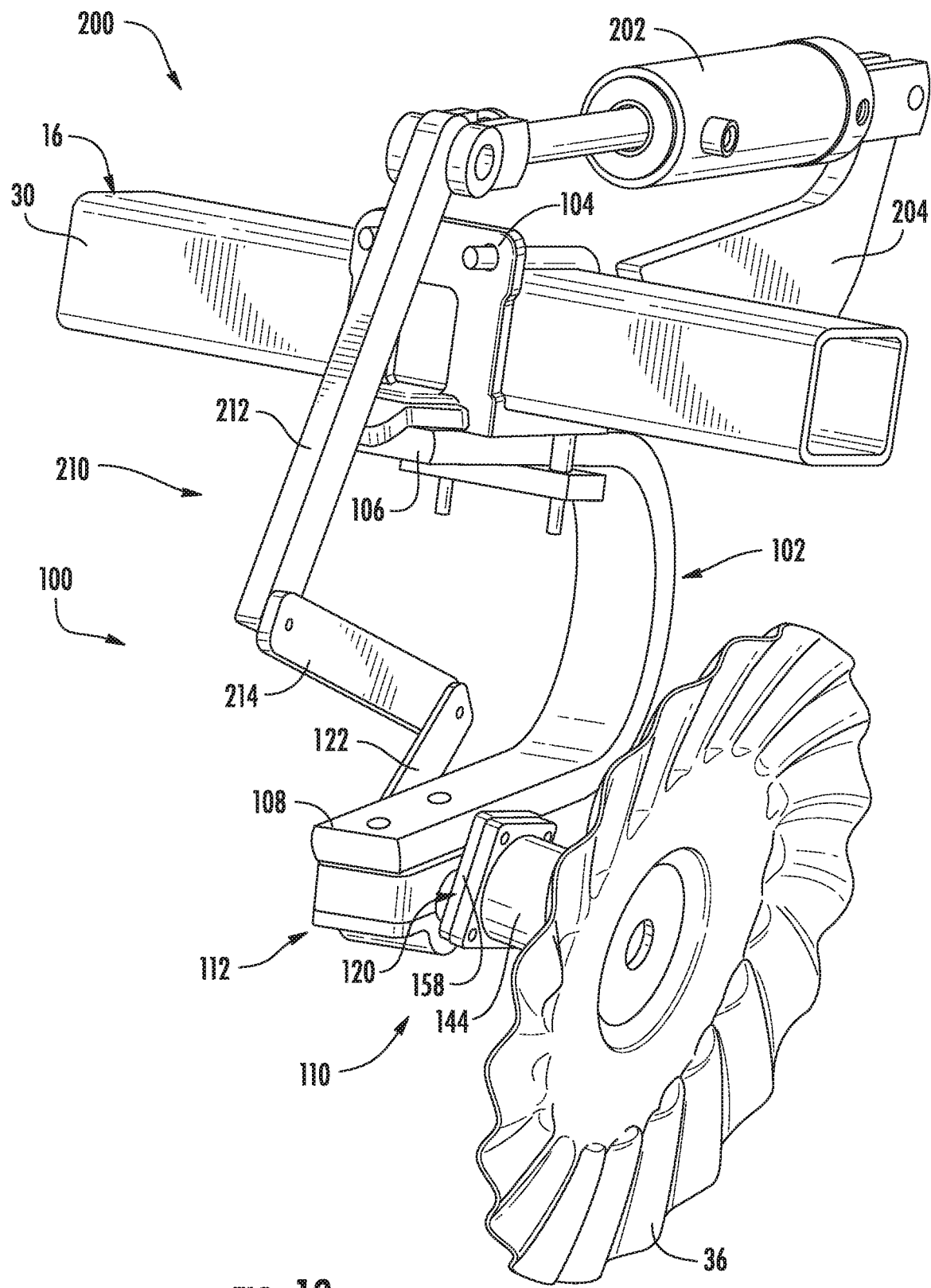
FIG. 10 illustrates a perspective view of an alternative embodiment of the disk assembly shown in FIG. 9, particularly illustrating the disk assembly having a single blade mounting arrangement as opposed to a tandem blade mounting arrangement in accordance with aspects of the present subject matter.

Referring now to FIG. 10, a perspective view of an alternative configuration for the disk assembly 100 described above is illustrated in accordance with aspect of the present subject matter. As shown, the pivot linkage 210 and the linear actuator 202 are generally configured the same as that described above with reference to FIG. 9. Additionally, the disk assembly 100 is generally configured similar to the disk assembly described above with reference to FIGS. 4, 5, 7, and 8. However, as opposed to the tandem blade mounting arrangement, the disk assembly 100 includes a single blade mounting arrangement. In such an embodiment, the hanger spindle 120 of the spindle assembly 110 may only be configured to have a single disk 36 coupled thereto. For instance, the hanger spindle 120 may be configured to include a single mounting flange for coupling the associated blade hub and blade spindle to the hanger spindle 120 (e.g., the mounting flange 158 positioned opposite the spindle crank arm 122 as shown in FIG. 10).

It should be appreciated that the present subject matter also directed to a method for adjusting the orientation of blades of agricultural implements. In one implementation, the method may include supporting a blade 36 of a disk assembly 100 relative to a frame 16 of an agricultural implement 10 such that the blade 36 defines an angle-of-engagement 82 relative to a horizontal reference line 88 and a camber angle 80 relative to a vertical reference line 86. In addition, the method may include rotating a hanger spindle 120 of the disk assembly 100 about its axis of rotation 130 to simultaneously adjust both the angle-of-engagement 82 and the camber angle 80 of the blade 36.

Figure 11:
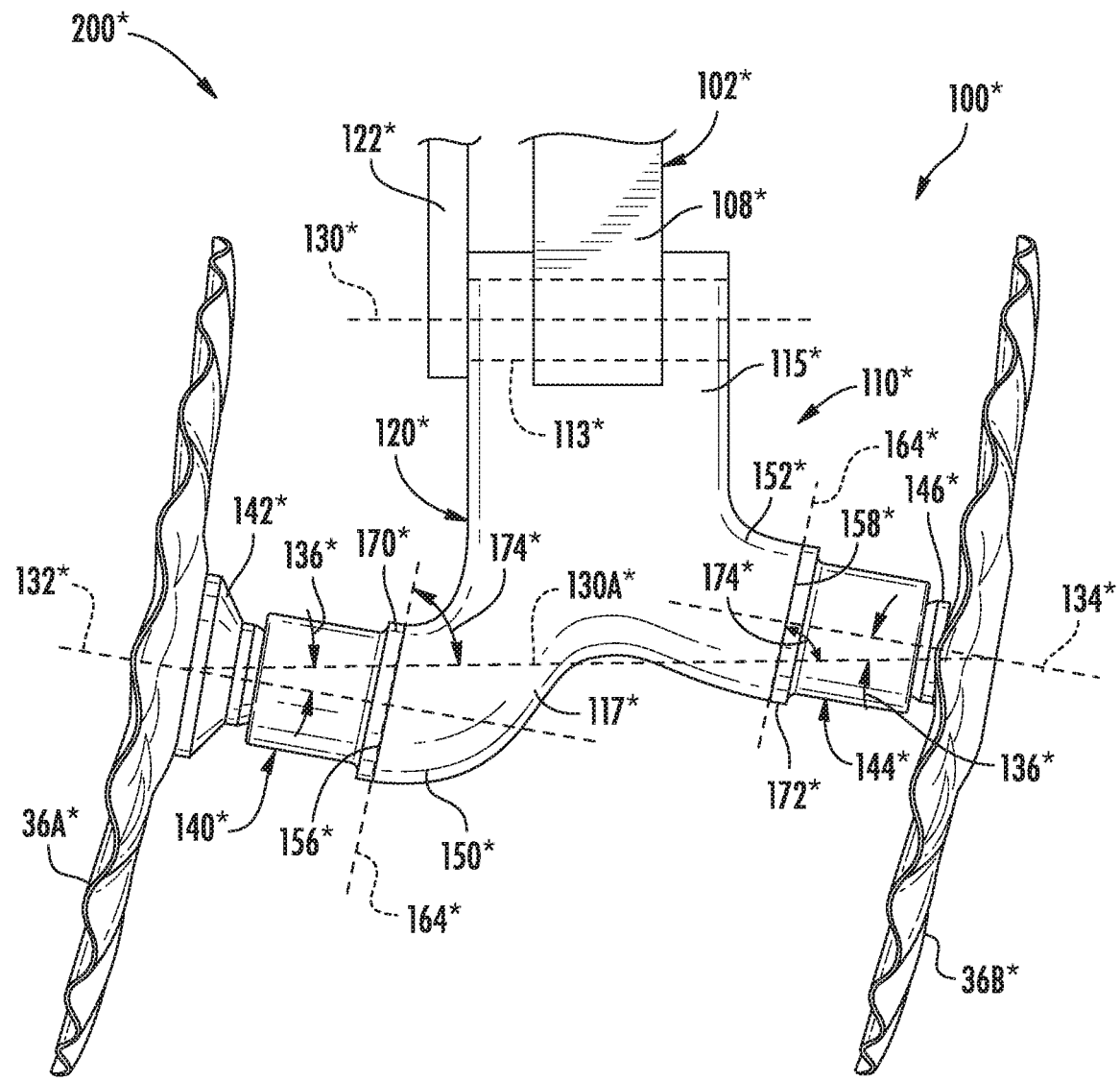
FIG. 11 illustrates a top, partial view of yet another embodiment of a disk assembly and a related system for adjusting the orientation of blades of an agricultural implement in accordance with aspects of the present subject matter.

Referring now to FIG. 11, a top, partial view of yet another embodiment of a disk assembly 100* and a related system 200* for adjusting the orientation of blades of an agricultural implement is illustrated in accordance with aspects of the present subject matter. In general, the disk assembly 100*, the system 200* and their associated components and/or features are configured similar to the disk assembly 100 and system 200 described above with reference to FIGS. 4-8 and their associated components. As such, components and/or features of the disk assembly 100* and/or system 200* that are the same or similar to corresponding components and/or features of the disk assembly 100 and/or system 200 described above will be designated with same reference character with an asterisk (*) added. Additionally, when a given component and/or feature of the disk assembly 100* and/or system 200* is configured to generally perform the same function as the corresponding component and/or feature of the disk assembly 100 and/or system 200* described above, a less detailed description of such component/feature will be provided below for the sake of brevity.

As shown, the disk assembly 100* includes first and second blades 36A*, 36B* configured to be coupled to an associated spindle assembly 110*, with the spindle assembly 110*, in turn, configured to be coupled to the distal end 108* of a disk hanger 102* (only a portion of which is shown in FIG. 11) to allow the blades 36A*, 36B* to be supported relative to a toolbar or frame member of an agricultural implement (e.g., frame member 30 of the implement frame 16 described above). Similar to the spindle assembly 110 described above, the spindle assembly 110* may be configured to rotationally support the blades 36A*, 36B* relative to the disk hanger 102* to allow the blades 36A*, 36B* to rotate relative to the soil during operation of the agricultural implement 10. In addition, the spindle assembly 110* may allow for the orientation of the blades 36A*, 36B* to be adjusted relative to multiple planes. For instance, the spindle assembly 110* may allow for simultaneous adjustment of both the angle-of-engagement 82 (FIGS. 3A and 3B) and the camber angle 80 (FIGS. 2A and 2B) of each blade 36A*, 36B*. Such adjustment is achieved by configuring the blades 36A*, 36B* to be rotatable about rotational axes that are offset from or non-parallel relative to the rotational axis about which a hanger spindle 120* of the spindle assembly 110* is configured to be rotated. As a result, by rotating the hanger spindle 120* about its rotational axis relative to the adjacent distal end 108* of the disk hanger 102*, the angle-of-engagement 82 and the camber angle 80 of each blade 36A*, 36B* may be adjusted simultaneously as the orientation of the blades 36A, 36B is varied across multiple planes due to the offset mounting configuration.

As shown in FIG. 11, the hanger spindle 120* of the spindle assembly 110* is generally configured to be supported relative to the distal end 108* of the hanger 102* via a suitable pivotable coupling for rotation about an axis of rotation (indicated by dashed line 130* in FIG. 11). For instance, in the illustrated embodiment, a hanger portion 115* of the hanger spindle 120* (e.g., the portion of the spindle 120* positioned adjacent the hanger 102*) has a clevis-type configuration configured to receive the distal end 108* of the hanger 102*. In such an embodiment, a pivot pin (indicated by dashed lines 113*) or other suitable pivotable coupling may be utilize to pivotably mount the hanger spindle 120* relative to the distal end 108* of the hanger 102* for rotation about the axis of rotation 130*.

Additionally, in several embodiments, the spindle assembly 110* may also include a first blade hub/spindle pair (including a first blade hub 140* and associated first blade spindle 142*) and a second blade hub/spindle pair (including a second blade hub 144* and associated second blade spindle 146*) for coupling the first and second blades 36A*, 36B*, respectively, to the hanger spindle 120*. As shown, the first and second blades 36A*, 36B* may be configured to be coupled to the hanger spindle 120* such that each blade 36A*, 36B* is rotatable about an axis of rotation that is skewed or non-parallel relative to the axis of rotation 130* of the hanger spindle 120*. For instance, the first blades 36A* may be rotatable about a first blade axis of rotation (indicated by line 132* in FIG. 11), while the second blade 36B* may be rotatable about a separate second blade axis of rotation (indicated by line 134* in FIG. 11), with both of such axes of rotation 132*, 134* being oriented non-parallel relative to the axis of rotation 130* of the hanger spindle 120*.

As indicated above, the hanger spindle 120* includes a hanger portion 115* configured to be pivotably coupled to the distal end 108* of the disk hanger 102*. Additionally, in the illustrated embodiment, the hanger spindle 120* includes a disk portion 117* configured to be coupled to the first and second blades 36A*, 36B* via the respective blade hub/spindle pairs. Specifically, as shown in FIG. 11, the disk portion 117* of the hanger spindle 120* has a Y-shaped configuration extending from the hanger portion 115* of the spindle 120* to two opposed disk-mounting ends (namely a first end 150* and a second end 152*). Moreover, as shown in the illustrated embodiment, the hanger spindle 120* includes first and second mounting faces 156*, 158* defined at the opposed first and second ends 150, 152, respectively of its disk portion 117*. Each mounting face 156*, 158* may generally corresponds to a planar mounting face or surface for rigidly coupling the adjacent blade hub 140*, 144* to the hanger spindle 120 (e.g., using suitable fasteners). Specifically, as shown in FIG. 11, the first mounting face 156* defines a first planar mounting surface for coupling a corresponding planar mounting flange 170* of the first blade hub 140* to the hanger spindle 120*. Similarly, the second mounting face 158* defines a second planar mounting surface for coupling a corresponding planar mounting flange 172* of the second blade hub 144* to the hanger spindle 120*. As particularly shown in FIG. 11, the planar mounting faces 156*, 158* of the hanger spindle 120* are oriented non-perpendicularly relative to the axis of rotation 130* of the hanger spindle 120*. As a result, a planar mounting interface 164* is defined between each mounting face 156*, 158* of the hanger spindle 120* and the adjacent mounting flange 170*, 172* of each blade hub 140*, 144* that is skewed at an acute or obtuse offset mounting angle 174* relative to the central axis of rotation 130* (e.g., defined relative to a reference line 130A* extending parallel to the axis 130* in FIG. 11), depending on which side of the interface the offset angle 174* is being defined. Similar to the embodiment described above, the offset angle 174* may be selected such that each mounting interface 164* is offset from perpendicular (relative to the axis of rotation 130*) by a given amount generally corresponding to the desired maximum angle-of-engagement 82 and/or camber angle 80 for the blades 36A*, 36B*.

By securing the blade hubs 140*, 144* to the hanger spindle 120* using the offset, non-perpendicular mounting configuration described above, the axes of rotation 132*, 134* for the blades 36A*, 36B* may be oriented non-parallel to the axis of rotation 130* of the hanger spindle 120*. Specifically, as shown in FIG. 11, both the first blade axis of rotation 132* and the second blade axis of rotation 132* are oriented at a non-zero skew angle* relative to the central axis of rotation 130*, such as the acute angle 136* shown in the illustrated embodiment. In one embodiment, the blade axes of rotation 132*, 134* may also be oriented perpendicularly to the planar mounting interfaces 164* defines between the hanger spindle 120* and each blade hub 140*, 144*. In such an embodiment, the acute skew angle 136* shown in the illustrated embodiment may be equal to the amount of angular offset at which each planar mounting interface 164* is skewed from perpendicular relative to the central axis of rotation 130*.

It should be appreciated that, by configuring the spindle assembly 110* in the manner described above, rotation of the hanger spindle 120* about its axis of rotation 130* will result in the orientation of each blade 36A*, 36B* being adjusted across multiple planes, thereby allowing both the angle-of-engagement 82* and camber angle 80* of each blade 36A*, 36B* to be simultaneously adjusted. In this regard, the disk assembly 100* may also be coupled to or otherwise provided in operative association with one or more components of the disclosed system 200* for adjusting the orientation of blades 36A*, 36B*. For instance, as shown in FIG. 11, a spindle crank arm 122* (only a portion of which is shown in FIG. 11) may be coupled to the hanger spindle 120* (e.g., at or adjacent to the pivot axis 130* of the spindle 120*) such that actuation of the spindle crank arm 122* results in rotation of the spindle 120* about its axis of rotation 130*. In such an embodiment, the spindle crank arm 122 may, for example, be coupled to a corresponding pivot linkage (e.g., link 210 described above with reference to FIG. 4), which is, in turn, coupled a linear actuator (e.g., actuator 202 described above with reference to FIG. 4). Thus, extension or retraction of the actuator results in rotation of the hanger spindle 120* about the central axis of rotation 130*. Given the rigid connection of the hanger spindle 120* to each blade hub 140*, 144*, such rotation of the hanger spindle 120* results in corresponding rotation of the blades 36A*, 36B*. In this regard, due to the offset mounting configuration of the blades 36A*, 36B* relative to the hanger spindle 120* (particularly the offset configuration between the blade axes of rotation 132*, 134* and the axis of rotation 130* of the hanger spindle 120*), the orientation of each blade 36A*, 36B* is adjusted across multiple planes as the blades 36A*, 36B* rotate with the hanger spindle 120*.

It should also be appreciated that, given the configuration of the disclosed spindle assembly 110*, the hanger spindle 120* may be prevented from rotating about its axis of rotation 130* during operation of the implement 10 in a manner similar to that described above with reference to FIG. 4 (e.g., due to the connection provided between the hanger spindle 120 and the linear actuator 202 of the embodiment shown in FIG. 4). As such, during the performance of an agricultural operation, each blade 36A*, 36B* may simply be configured to rotate about its respective blade axis of rotation 132*, 134*.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A disk assembly for agricultural implements, the disk assembly comprising:
    a disk hanger including a proximal end and a distal end opposite the proximal end, the proximal end configured to be coupled to a frame of an agricultural implement;
    a hanger spindle supported relative to the distal end of the disk hanger for rotation about a first axis of rotation;
    a blade spindle supported relative to the hanger spindle, the blade spindle being rotatable about a second axis of rotation oriented non-parallel relative to the first axis of rotation; and
    a blade coupled to the blade spindle for rotation therewith about the second axis of rotation, the blade defining an angle-of-engagement relative to a horizontal reference line and a camber angle relative to a vertical reference line,
    wherein rotation of the hanger spindle relative to the disk hanger about the first axis of rotation results in an adjustment of both the angle-of-engagement and the camber angle of the blade; and wherein the hanger spindle extends between a first end of the hanger spindle and a second end of the hanger spindle, the blade spindle and blade being supported for rotation about the second axis of rotation at a location adjacent to the first end of the hanger spindle, the disk assembly further comprising:
    a second blade spindle supported adjacent to the second end of the hanger spindle, the second blade spindle being rotatable about a third axis of rotation oriented non-parallel relative to the first axis of rotation; and
    a second blade coupled to the blade spindle for rotation therewith about the third axis of rotation.

2. The disk assembly of claim 1, further comprising a blade hub coupled to the hanger spindle for rotation therewith, the blade spindle being supported by the blade hub for rotation relative to the blade hub about the second axis of rotation.

3. The disk assembly of claim 2, wherein the hanger spindle includes a first end of the hanger spindle and a second end of the hanger spindle, at least one of the first end or the second end of the hanger spindle defining a planar mounting surface oriented non-perpendicular relative to the first axis of rotation of the hanger spindle.

4. The disk assembly of claim 3, wherein the blade hub is coupled to the hanger spindle via the planar mounting surface.

5. The disk assembly of claim 3, wherein the second axis of rotation of the blade spindle is oriented perpendicular to the planar mounting surface.

6. The disk assembly of claim 1, wherein the relative non-parallel orientation defined between the first and second axes of rotation is selected such that the camber angle of the blade increases with decreases of the angle-of-engagement of the blade as the hanger spindle is rotated about the first axis of rotation.

7. The disk assembly of claim 1, further comprising a pillow block assembly coupled to the distal end of the disk hanger, the pillow block assembly supporting the hanger spindle for rotation relative to the disk hanger about the first axis of rotation.

8. A system for adjusting the orientation of blades of agricultural implements, the system comprising:
a disk assembly configured to be supported relative to a frame of an agricultural implement, the disk assembly comprising:
a disk hanger;
a hanger spindle supported relative to the disk hanger for rotation about a first axis of rotation;
a blade spindle supported relative to the hanger spindle, the blade spindle being rotatable about a second axis of rotation oriented non-parallel relative to the first axis of rotation; and
a blade coupled to the blade spindle for rotation therewith about the second axis of rotation, the blade defining an angle-of-engagement relative to a horizontal reference line and a camber angle relative to a vertical reference line; and
a pivot linkage coupled to the hanger spindle such that actuation of the pivot linkage results in rotation of the hanger spindle about the first axis of rotation;
wherein, as the pivot linkage is actuated, the hanger spindle is rotated relative to the disk hanger about the first axis of rotation in a manner that results in an adjustment of both the angle-of-engagement and the camber angle of the blade.

9. The system of claim 8, further comprising an actuator coupled to the pivot linkage, the actuator being configured to actuate the pivot linkage so as to rotate the hanger spindle about the first axis of rotation.

10. The system of claim 9, wherein the disk assembly is one of a plurality of disk assemblies configured to be supported relative to a frame of an agricultural implement and the pivot linkage comprises one of a plurality of pivot linkages, each pivot linkage being coupled to the hanger spindle of a respective disk assembly of the plurality of disk assemblies such that actuation of each pivot linkage results in rotation of the hanger spindle of the respective disk assembly, the system further comprising:
a rockshaft coupled to each pivot linkage and to the actuator such that the actuator is configured simultaneously actuate the plurality of pivot linkages via the connection provided by the rockshaft.

11. The system of claim 10, wherein the rockshaft is coupled to the actuator via a crank arm such that actuation of the linear actuator results in rotation of the rockshaft.

12. The system of claim 8, further comprising a blade hub coupled to the hanger spindle for rotation therewith, the blade spindle being supported by the blade hub for rotation relative to the blade hub about the second axis of rotation.

13. The system of claim 12, wherein the hanger spindle extends between a first 1 end of the hanger spindle and a second end of the hanger spindle, at least one of the first end or the second end of the hanger spindle defining a planar mounting surface oriented non-perpendicular relative to the first axis of rotation of the hanger spindle.

14. The system of claim 13, wherein the blade hub is coupled to the hanger spindle via the planar mounting surface.

15. The system of claim 13, wherein the second axis of rotation of the blade spindle is oriented perpendicular to the planar mounting surface.

16. The system of claim 8, wherein the relative non-parallel orientation defined between the first and second axes of rotation is selected such that the camber angle of the blade increases with decreases of the angle-of-engagement of the blade as the hanger spindle is rotated about the first axis of rotation.

17. The system of claim 8, wherein the hanger spindle extends between a first end of the hanger spindle and a second end of the hanger spindle, the blade spindle and blade being supported for rotation about the second axis of rotation at a location adjacent to the first end of the hanger spindle, the disk assembly further comprising:
a second blade spindle supported adjacent to the second end of the hanger spindle, the second blade spindle being rotatable about a third axis of rotation oriented non-parallel relative to the first axis of rotation; and
a second blade coupled to the blade spindle for rotation therewith about the third axis of rotation.

18. A method for adjusting the orientation of blades of agricultural implements, the method comprising:
supporting a blade of a disk assembly relative to a frame of an agricultural implement such that the blade defines an angle-of-engagement relative to a horizontal reference line and a camber angle relative to a vertical reference line, the disk assembly comprising a disk hanger including a proximal end configured to be coupled to the frame and a distal end opposite the proximal end, the disk assembly further comprising a hanger spindle supported relative to the distal end of the disk hanger for rotation about a first axis of rotation and a blade spindle supported relative to the hanger spindle, the blade spindle being rotatable about a second axis of rotation oriented non-parallel relative to the first axis of rotation, the blade being coupled to the blade spindle for rotation therewith about the second axis of rotation; and
rotating the hanger spindle about the first axis of rotation to simultaneously adjust both the angle-of-engagement and the camber angle of the blade, wherein rotating the hanger spindle about the first axis of rotation comprises actuating a pivot linkage coupled to the hanger spindle such that the hanger spindle rotates about the first axis of rotation.

* * * * *